(12) United States Patent
Lee et al.

(10) Patent No.: US 7,764,511 B2
(45) Date of Patent: Jul. 27, 2010

(54) MULTIDIRECTIONAL CONFIGURABLE ARCHITECTURE FOR MULTI-PROCESSOR SYSTEM

(75) Inventors: Mario J. D. Lee, Fremont, CA (US); Tomonori Hirai, Fremont, CA (US); Jyh Ming Jong, Fremont, CA (US)

(73) Assignee: Mitac International Corp., Hsinchu (TW)

( * ) Notice: Subject to any disclaimer, the term of this patent is extended or adjusted under 35 U.S.C. 154(b) by 622 days.

(21) Appl. No.: 11/687,582

(22) Filed: Mar. 16, 2007

(65) Prior Publication Data

US 2008/0046617 A1 Feb. 21, 2008

Related U.S. Application Data

(60) Provisional application No. 60/822,543, filed on Aug. 16, 2006.

(51) Int. Cl.
*H05K 7/14* (2006.01)
(52) U.S. Cl. ........................ 361/796; 361/756; 361/788
(58) Field of Classification Search ................. 361/796, 361/752, 730, 790, 797, 800, 788, 756, 727
See application file for complete search history.

(56) References Cited

U.S. PATENT DOCUMENTS

| 5,296,748 A * | 3/1994 | Wicklund et al. ............ 327/565 |
| 6,202,110 B1 * | 3/2001 | Coteus et al. ................ 710/301 |
| 7,388,757 B2 * | 6/2008 | Moakes et al. ............... 361/788 |
| 2005/0207134 A1 * | 9/2005 | Belady et al. ................ 361/796 |

* cited by examiner

*Primary Examiner*—Hung S Bui
(74) *Attorney, Agent, or Firm*—Apex Juris, pllc; Tracy M Heims

(57) ABSTRACT

A physical hardware architecture is provided to fulfill flexibility, serviceability and configurability of a multi-processor system. The architecture mainly includes a bottom plane, plural processor boards and a function board. On the front section of the top side of the bottom plane, the processor boards are configured thereon. The function board faces downwards and is configured in an edge-to-edge connection with the front edge of the bottom plane. Function card(s) may be configured vertically on the bottom surface of the function board. On the rear section of the top side of the bottom plane expansion card(s) are configured vertically. With main system fan(s) located on the top of the function board and auxiliary system fan configured under the bottom plane, the multi-processor system will also achieve optimum cooling capability through the architecture.

19 Claims, 6 Drawing Sheets

MULTIDIRECTIONAL CONFIGURABLE ARCHITECTURE FOR MULTI-PROCESSOR SYSTEM

BACKGROUND OF THE INVENTION

1. Related Applications

This application is related to U.S. application Ser. No. 11/687,571 to Lee et al., entitled "Chassis Partition Architecture for Multi-processor System" filed concurrently herewith, and which is herein incorporated by reference.

2. Field of Invention

The present invention relates to the physical hardware architecture of a multi-processor system, and more particularly, to a multidirectional configurable architecture for a multi-processor system.

3. Related Art

For a multi-processor system with processors configured on plural printed circuit boards, traditional electronic enclosure design requires a complex and expensive internal chassis with many routed cables therein to provide mechanical support for the electronic components. The requirements for variable types of IO devices and storage unit including hot swapping plus airflow for cooling further increase the complexity of the system design. This complexity increases the overall sides of the system and in some cases limits some configurable options to be part of the "base architecture", which is dictated by the overall dimensions of the chassis and internal structure. One example is the difficulty in servicing the center interconnecting plane. Most backplane and midplane designs in the prior art are not field serviceable due to difficulty or no access in the assembled chassis. Another example is the difficulty to provide sufficient cooling and airflow to the various components due to blockage as a result of the placement of the different parts of the system. Besides, once numerous function cards need to be configured on the system, it becomes much more difficult to fulfill the requirements of cooling, serviceability and hardware reliability. For high-end systems, flexibility will be another critical issue.

Basically, there are two major factors to decide the configurable directions or serviceability of a computing system. First of all, the way of physical division decides how the hardware components of the computing system are separated into subsystem boards. The other is the connection types between these subsystem boards. Both the physical division for hardware components and the connection types of subsystem boards affect the cooling performance and hardware reliability. Although theoretically the more the subsystem boards are divided, the higher the system flexibility will be. However, the physical division is still limited by actual hardware capabilities.

As shown in FIG. 1, the front portion in a chassis 10 of a clustering system is configured with plural mainboards (mother boards) 11. The lower half of the rear portion in the chassis 10 is configured with one or more power supply 12 that has dedicated fan(s); however, the power supply 12 at the lower portion is still a blockage for the main air flow generated by several main fans 13 at the upper portion. Since the airflow has to pass the power supply 12 through small fan(s), the flow rate through the power supply 12 is usually smaller than the main fans 13. Therefore, the processors 110 are configured at upper positions. In such simple system, the mainboards 11 slides inwards/outwards through the front side of the chassis 10 so it is only front-side serviceable and configurable. Generally the chassis 10 has predetermined access holes to allow human hands reaching inside.

FIG. 2 shows an 8-way system. Four processors 210 with dedicated system memories 211 are configured on each of the two stacked processor boards 21. Between the two processor boards 21, two system bus cards 22 are used for board-to-board connection through connectors 212. Such system obviously is top-side serviceable and configurable due to its hardware architecture. Engineers have to remove the upper processor boards 21 to access the lower processor boards 21 and the two system bus cards 22.

FIG. 3 shows another 8-way system 3, which includes four dual-processor cards 31 configured on a baseboard 32, and an input/output board 33 engaged with the baseboard 32 through several edge connectors 34. Each of the four dual-processor cards 31 faces another two by two, with one or more fan 35 configured between each pair of four dual-processor cards 31. Expansion card(s) 331, I/O controller(s) 332 and bridge chips 333 are located on the input/output board 33. The cooling problem in such "flat" system is that the sizes of the fans 35 is relatively smaller, which require high rotation speed to carry away the heat efficiently. However, the higher the fan speed increases, the more the fan noise occurs. Besides, although such system has overall two or three serviceable/configurable sides (the two lengthwise sides and the top side), the cooling, serviceability and reliability problems will still occur when extra function cards (not shown) are added on the system architecture.

If the extra function cards are arranged lengthwise (following the directions of the dual-processor cards 31), the system will has a strange flat, long structure and the flow paths will be too long to dissipate heat efficiently. If the extra function cards are arranged widthwise (parallel to the expansion card(s) 331), the trace lengths on the input/output board 33 might be too long to meet bus communication requirements. Plus the arrangement of blockage units like hard drives, the architecture becomes extremely complicated.

SUMMARY OF THE INVENTION

Accordingly, the present invention basically provides an optimum physical hardware division and preferred hardware architecture for a clustering system.

In an embodiment of the present invention, an architecture mainly includes a bottom plane, plural processor boards and a function board. On the front section of the top side of the bottom plane, the processor boards are configured thereon. The function board faces downwards and is configured in an edge-to-edge connection with the front edge of the bottom plane. Function card(s) may be configured vertically on the bottom surface of the function board. On the rear section of the top side of the bottom plane expansion card(s) are configured vertically. With main system fan(s) located on the top of the function board and auxiliary system fan configured under the bottom plane, the multi-processor system will also achieve optimum cooling capability through the architecture.

In an embodiment of the present invention, the bottom plane includes plural front edge connectors at the bottom surface of the bottom plane. Meanwhile, the function board includes plural rear edge connectors at the bottom surface of the function board to connect with the front edge connectors of the bottom plane.

In an embodiment of the present invention, parts of the processor boards exceed the front edge of the bottom plane and reach over the top of the function board.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
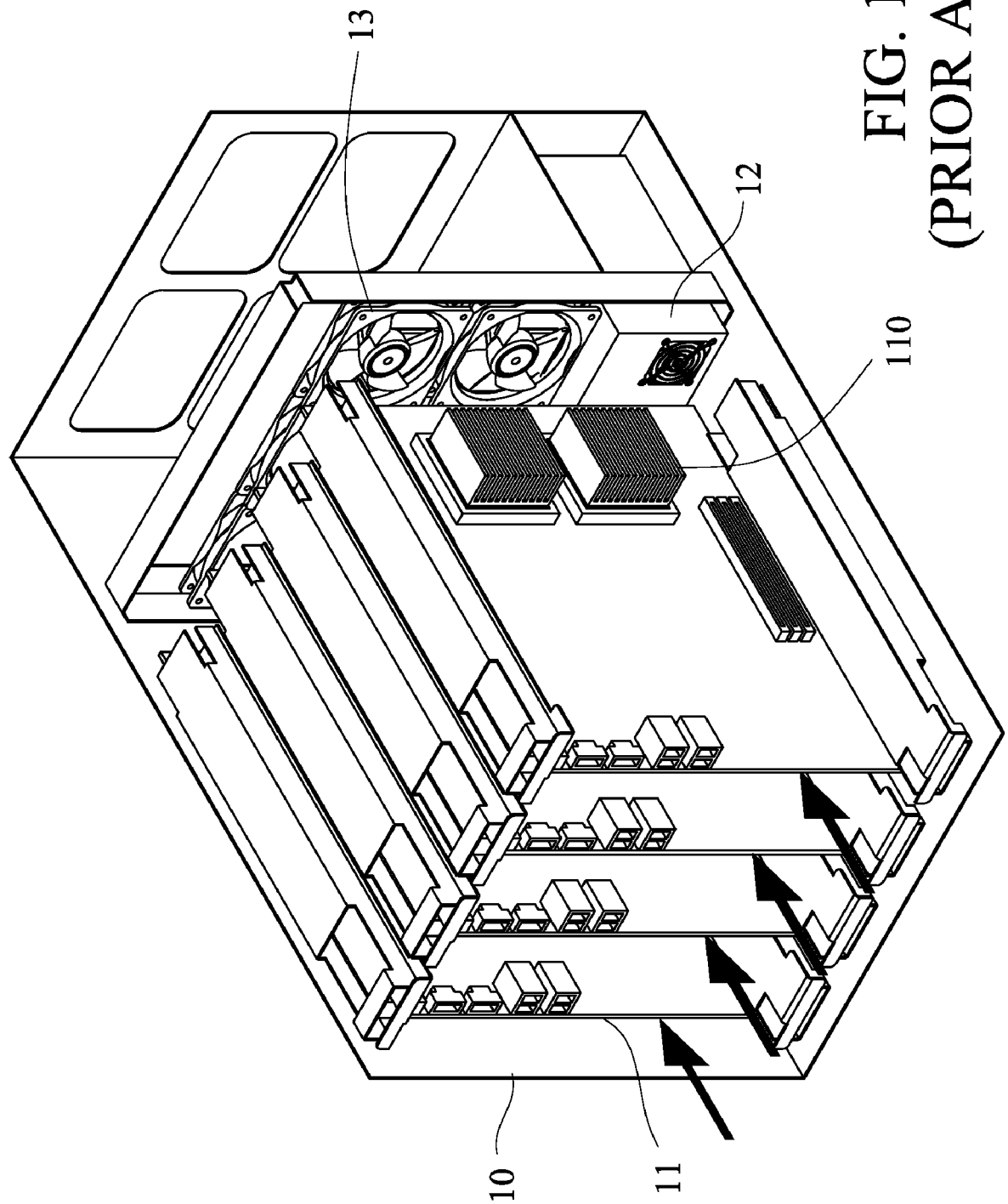
FIG. 1 shows an explanatory diagram for the hardware architecture of a clustering system in the prior art.
Figure 2:
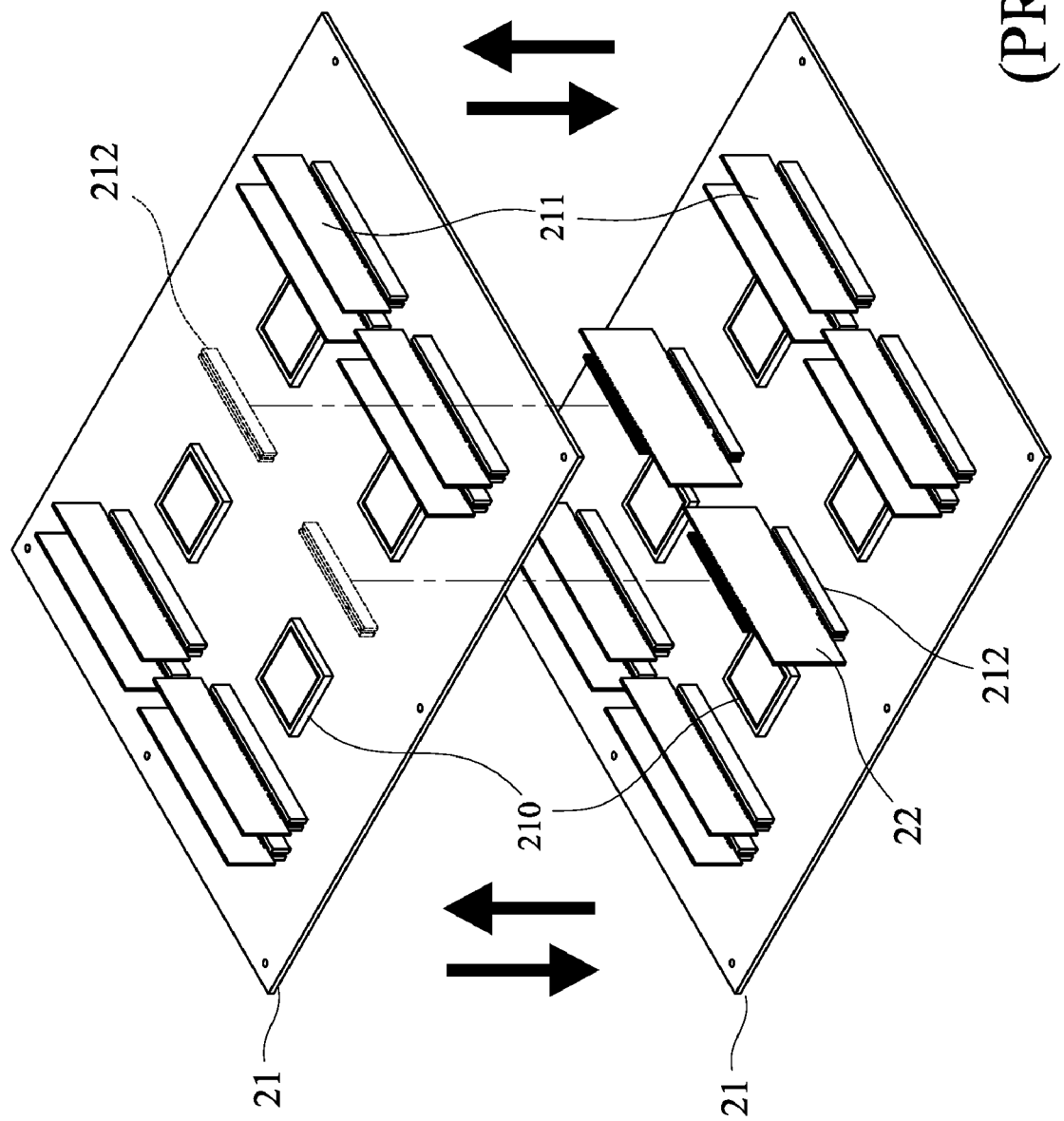
FIG. 2 shows an explanatory diagram for the hardware architecture of a 8-way system in the prior art.
Figure 3:
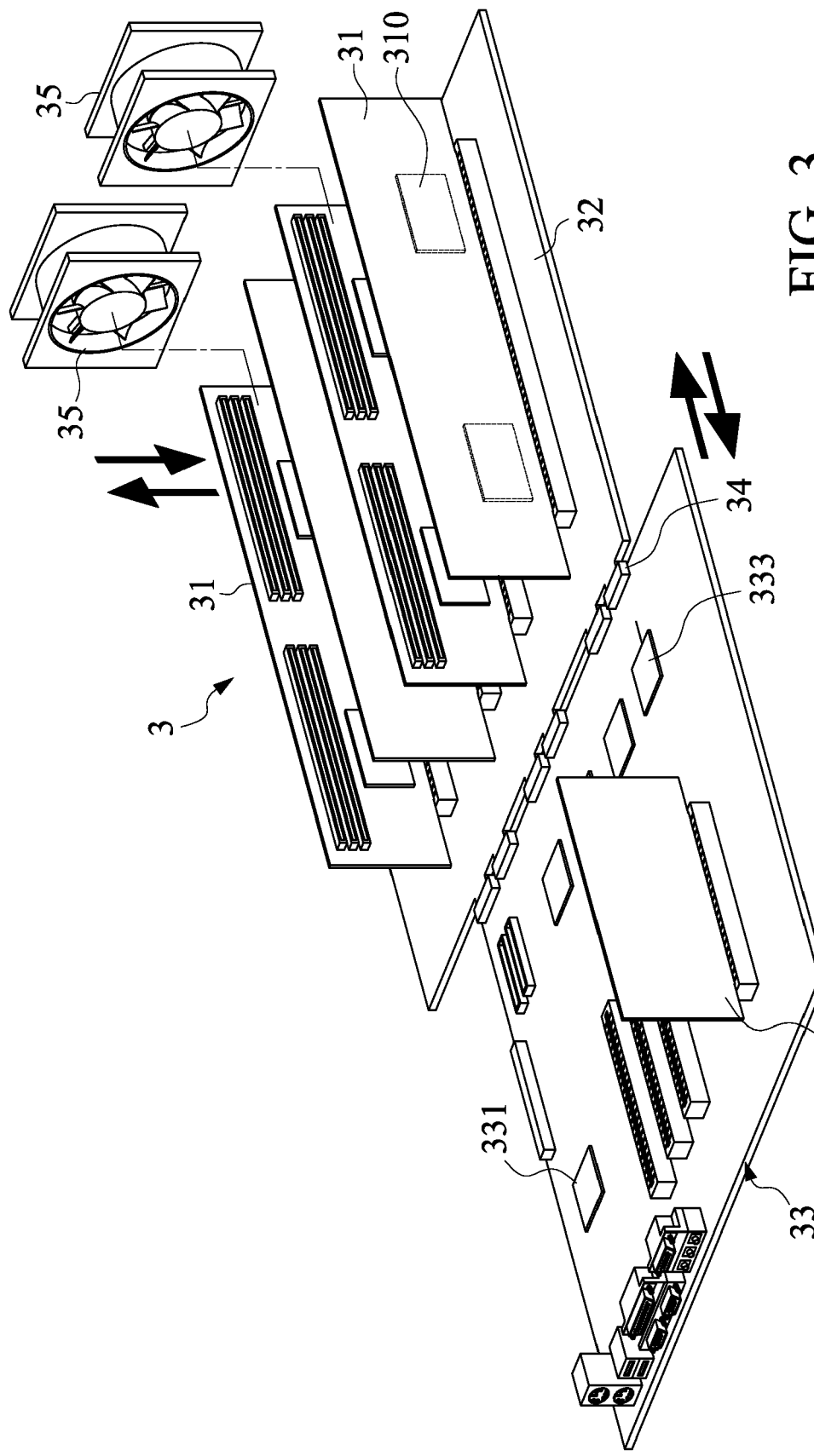
FIG. 3 shows an explanatory diagram for the hardware architecture of another 8-way system in the prior art.
Figure 4:
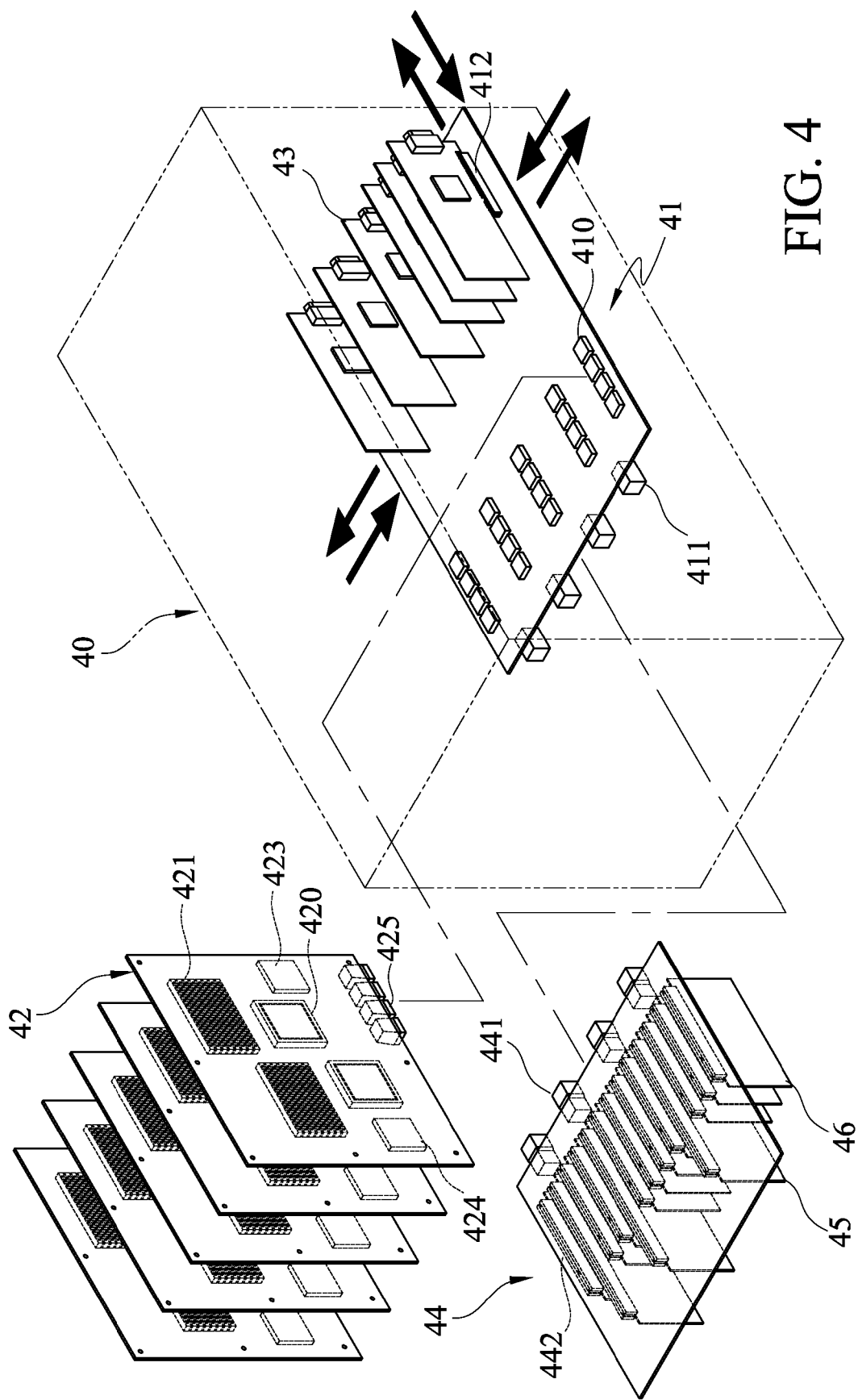
FIG. 4 shows a decomposition diagram for a multidirectional configurable architecture for a multi-processor system according to an embodiment of the present invention.
Figure 5:
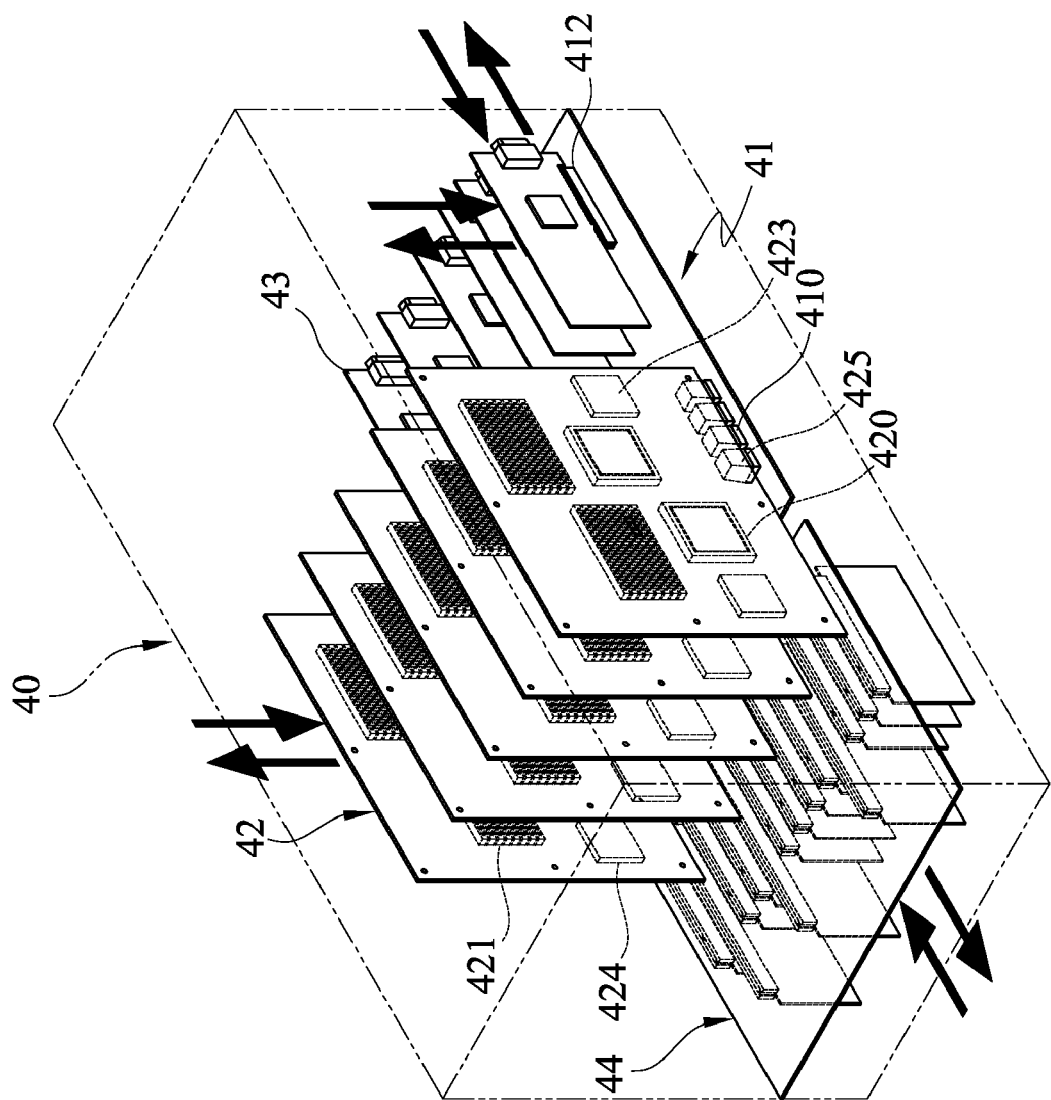
FIG. 5 shows a combination diagram for the multidirectional configurable architecture in FIG. 4.

Please refer to FIGS. 4 and 5. A multi-processor system according to an embodiment of the present invention mainly includes a chassis 40, a bottom plane 41, plural processor boards 42, plural expansion cards 43, a function board 44 and plural function cards 45 and 46.

For convenience of explanation, the physical structure of the chassis 40 is omitted in the drawings. The chassis 40 includes necessary partitions, frameworks and housings to provide reliable mechanical supports to the bottom plane 41, the processor boards 42, the expansion cards 43, the function board 44, the function cards 45, 46 and other electrical assemblies. To provide multidirectional configurability or serviceability, necessary openings and related slide modules will be predetermined as well.

The bottom plane 41 is configured horizontally and facing upwards at the lower section of the chassis 40, near the rear side. The bottom plane 41 mainly includes plural system connectors 410 (such as FCI Airmax connectors) at its front section for connecting with the processor boards 42. Plural front edge connectors 411 (such as FCI Airmax connectors) located at the bottom surface and the front edge of the bottom plane 41 are used to connect the bottom plane 41 and the function board 44 edge-to-edge. The bottom plane 41 is in an edge-to-edge connection with the function board 44. At the rear section of the bottom plane 41, plural expansion connectors 412 (such as PCI-Express connectors) are configured to allow expansion cards 43 inserting therein. The bottom plane 41 in the embodiment is basically the major body of the entire hardware system. Almost every other units or modules are connected to the bottom plane 41, directly or indirectly. The service directions of the bottom plane 41 may be the laterals (left or right) and the rear. It will be configured into the chassis 40 first and become the last serviceable. In certain conditions, the bottom plane 41 may be configured on a slide tray for configuration convenience.

Additionally, the bottom plane 41 may be shorter and make parts of the processor boards 42 exceed the front edge of the bottom plane 41 and reach over the top of the function board 44. Such design will shorten the length of the bottom plane 41 and save space for the function board 44, thereby achieving an optimum space arrangement and a compact architecture.

Each of the processor boards 42 mainly includes two processors 420, memories 421, a bridge chip(s) 423 (like North Bridge or South Bridge) and a BMC (Baseboard Management Controller) 424. Several bottom edge connectors 425 (such as FCI Airmax connectors) are configured at the bottom edges of the processor boards 42 to connect the system connectors 410 and stand vertically on the bottom plane 41. The processor boards 42 are allowed mounting/demounting or being serviceable or configurable from the top side. Some slide tray module (not shown) may be applied to every processor board 42. In certain cases, the five processor boards operate as one head node and four compute nodes. In some systems, the processors may possibly have no dedicated memories.

Basically, the expansion cards 43 are configured parallel to the processor boards 42. The expansion cards 43 are serviceable or configurable from the top side or the rear side. In some cases, the expansion cards are network cards (such as InfiniBand or Ethernet cards), audio cards or graphic cards. It is possible that the expansion cards 43 are inserted into the expansion connectors 412 before configuring the bottom plane 41 inside the chassis 40.

The function board 44 faces downwards and connects with the front edge connector 411 of the bottom plane 41 through its rear edge connectors 442 (such as FCI Airmax connectors) located at its rear edge and bottom surface. Plural function connectors 442 are also configured on the bottom surface of the function board 44 to connect with plural function cards 45, 46. Limited by the connecting direction, the function board 44 is serviceable or configurable from the front side.

The function cards 45, 46 are configured parallel to the processor boards 42 or the expansion cards 43. The function cards 45, 46 are serviceable or configurable from the bottom side. In some cases, the function cards 45, 46 are network cards (such as Infiniband or Ethernet cards), audio cards or graphic cards. Of course the function cards 45, 46 may be inserted into the function connectors 442 first before connecting the function board 44 with the bottom plane 41.

The architecture disclosed above provides multidirectional serviceability and configurability for a multi-processor system.

If the function board 44 is configured facing upwards with the function cards 45, 46 standing vertically, the overall length will be too long to dissipate heat efficiently.

Meanwhile, if the function board 44 is configured next to the rear edge of the bottom plane 41, the communication path between the processor boards 42 and the function cards 45, 46 will be too long to fulfill the requirement of high data communication speed; such architecture has a long overall length and the cooling problem as well.

If the function board 44 is configured next to one of the lateral sides (the left or right sides) of the bottom plane 41 and make the function cards 45, 46 aligned parallel to the expansion cards 43, the communication path may not be too long but the cooling solution will be difficult for the function board 44 and function cards 45, 46. Besides, the arrangements of other modules or units like hard drives and power supplies might become cooling blockage of the function cards 45, 46.

If the function board 44 and the bottom plane 41 are combined as one board, such system will be lack of flexibility because the function cards will not allow changing specifications.

The disclosed way to partition the whole system also contributes an optimized architecture to achieve hardware performance, serviceability, flexibility and cooling capability.

Figure 6:
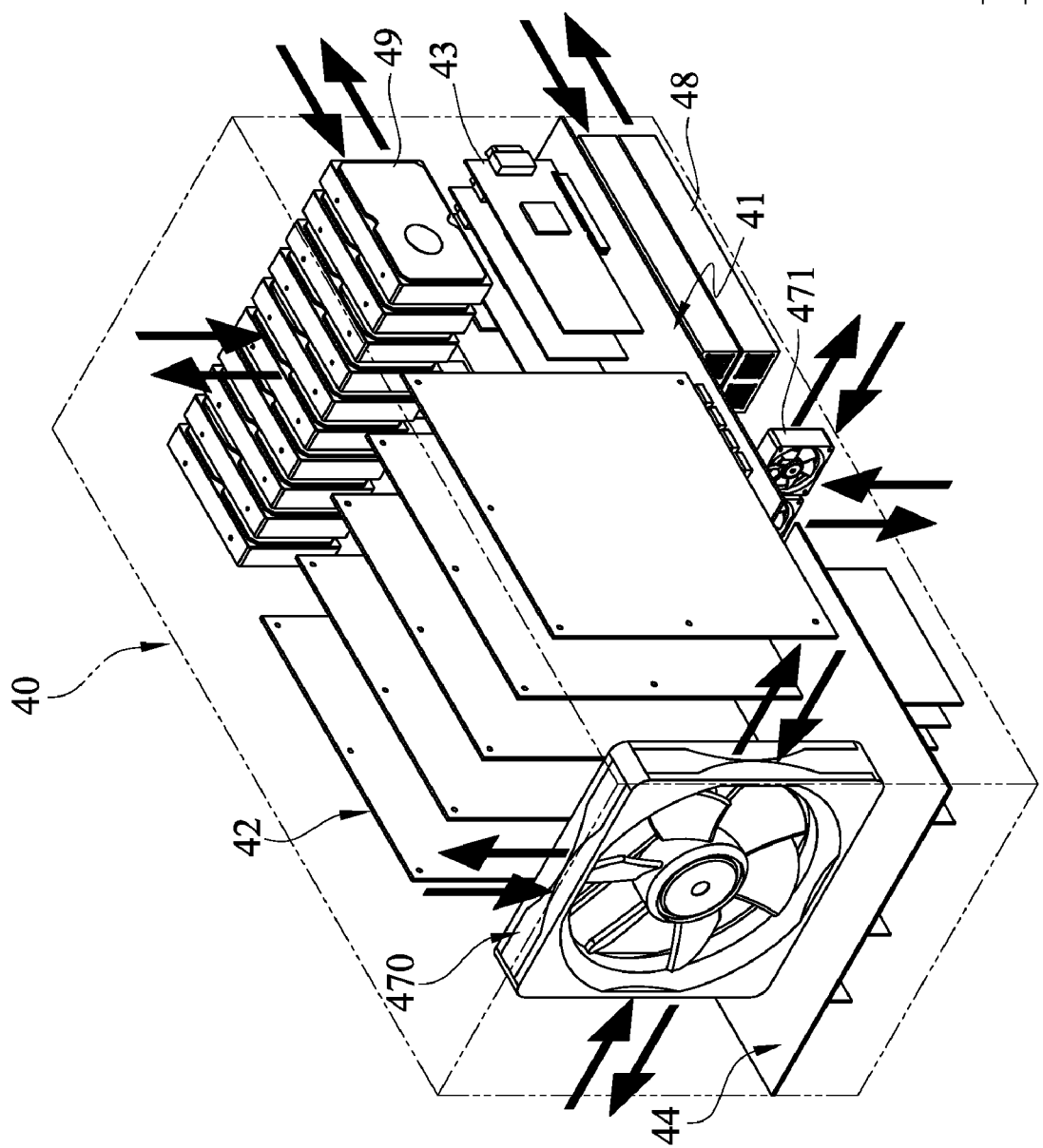
FIG. 6 shows an explanatory diagram for a multidirectional configurable architecture for a multi-processor system according to another embodiment of the present invention.

Please refer to FIG. 6. Another embodiment of the present invention presents an optimum architecture for a complete multi-processor system. The main units including the bottom plane 41, the processor boards 42, the expansion cards 43, the function board 44 and the function cards 45 and 46 remain the same as shown in FIGS. 4 and 5; only the present architecture includes two airflow channels. One passes through the processor boards 42 and expansion cards 43 (the top section of the system); the other passes through the function cards 45, 46 (the bottom section of the system).

The choices of the main system fan 470 may be one large, quite fan or four smaller fans; either may be configured in front of the bottom plane 41 and also on the top of the function board 44. The one or more main system fan 470 is serviceable or configurable from the top side or the lateral sides.

Plural hard drives 49 may be configured on the top of the expansion cards 43 and reserves sufficient space under the hard drives 49 for the upper airflow. The processors 420 may be configured on the lower section of the processor boards 42 to align with said reserved space and the expansion cards 43. The hard drives 49 are also serviceable or configurable from the top side or the read side.

One or more auxiliary system fan 471 (possibly with smaller size) is configured under the bottom plane 41 and located between the function cards 45, 46 and the power supplies 48. If the function cards 45, 46 and the expansion cards 43 generates different amount of heat, the cards that generates more heat may be arranged at the upper airflow channel. Plural power supplies 48 with dedicated fans may be configured under the rear section of the bottom plane 41. If the function cards 45, 46 generate less heat, the dedicated fans of the power supplies and the smaller auxiliary system fan(s) will provide enough airflow.

The auxiliary system fan(s) 471 will be serviceable or configurable from the bottom side or the lateral sides. As to the power supplies 48, generally the rear side is enough for service or configuration.

In short, FIG. 6 shows a bi-path cooling architecture according to the main architecture of the multi-processor system. Not only flexibility, serviceability and configurability are provided, a optimum cooling capability is accomplished as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An architecture of a multi-processor system, comprising:
   a bottom plane configured horizontally and facing upwards;
   a plurality of processor boards configured on a front section of a top side of the bottom plane;
   a function board facing downwards and being configured in an edge-to-edge connection with a front edge of the bottom plane;
   at least one function card configured vertically on a bottom surface of the function board; and
   wherein the bottom plane further comprises a plurality of front edge connectors at the bottom surface of the bottom plane, the function board further comprising a plurality of rear edge connectors at the bottom surface of the function board to connect with the front edge connectors of the bottom plane.

2. The architecture of claim 1 further comprising at least one expansion card configured vertically on a rear section of the top side of the bottom plane and parallel to the processor boards.

3. The architecture of claim 2, wherein the bottom plane comprises at least one expansion connector to connect with the expansion card.

4. The architecture of claim 2, wherein the expansion card is selected from the group consisting of network card, audio cards and graphic card.

5. The architecture of claim 2 further comprising at least one hard drive configured on the top of the expansion card with sufficient space reserved under the hard drives for airflow.

6. The architecture of claim 1, wherein the hard drive is serviceable or configurable from the top side or the rear side.

7. The architecture of claim 1, wherein the function board comprises at least one function connector facing downwards to connect with the function card.

8. The architecture of claim 1, wherein the function card is selected from the group consisting of network card, audio cards and graphic card.

9. The architecture of claim 1, wherein each of the processor boards comprises a plurality of processors, at least one memory and at least one bridge chip.

10. The architecture of claim 1, wherein the bottom plane comprises a plurality of system connectors, each of the processor boards comprising a plurality of bottom edge connectors to connect with the system connectors of the bottom plane.

11. The architecture of claim 1, wherein parts of the processor boards exceed the front edge of the bottom plane and reach over the top of the function board.

12. The architecture of claim 1, wherein the bottom plane is serviceable or configurable from the lateral sides or the rear side.

13. The architecture of claim 1, wherein the processor boards are serviceable or configurable from the top side.

14. The architecture of claim 1, wherein the function board is serviceable or configurable from the front side.

15. The architecture of claim 1 further comprising at least one main system fan configured on the top of the function board.

16. The architecture of claim 15, wherein the main system fan is configurable from the lateral sides or the top side.

17. The architecture of claim 1 further comprising at least one power supply with dedicated fan, the power supply being configured under the rear section of the bottom plane and configurable from the rear side.

18. The architecture of claim 17 further comprising at least one auxiliary system fan configured under the bottom plane and between the function card and the power supply.

19. The architecture of claim 18, wherein the auxiliary system fan is configurable from the lateral sides or the bottom side.

* * * * *